(12) United States Patent
Kim et al.

(10) Patent No.: US 9,303,790 B2
(45) Date of Patent: Apr. 5, 2016

(54) CABLE ANCHORING DEVICE

(71) Applicant: KYUNG CHANG INDUSTRIAL CO., Ltd., Daegu (KR)

(72) Inventors: Kyu-Jung Kim, Daegu (KR); Jae-Hyoung Park, Daegu (KR)

(73) Assignee: KYUNG CHANG INDUSTRIAL CO., LTD. (KR)

( * ) Notice: Subject to any disclaimer, the term of this patent is extended or adjusted under 35 U.S.C. 154(b) by 0 days.

(21) Appl. No.: 14/286,251

(22) Filed: May 23, 2014

(65) Prior Publication Data
US 2015/0219247 A1 Aug. 6, 2015

(30) Foreign Application Priority Data

Feb. 4, 2014 (KR) .................. 10-2014-0012476

(51) Int. Cl.
| | |
|---|---|
| *F16L 3/12* | (2006.01) |
| *F16L 3/13* | (2006.01) |
| *B60R 16/02* | (2006.01) |
| *H02G 3/32* | (2006.01) |

(52) U.S. Cl.
CPC ................ *F16L 3/13* (2013.01); *B60R 16/0215* (2013.01); *H02G 3/32* (2013.01)

(58) Field of Classification Search
CPC ........... F16L 37/088; F16L 3/13; F16L 37/14; H02G 3/083; H02G 3/32; Y10T 74/20462; Y10T 74/2045
USPC ............... 248/56, 57, 71, 221.11, 222.11; 74/502.4, 502.6; 174/153 G, DIG. 8; 285/151.1, 381.4
See application file for complete search history.

(56) References Cited

U.S. PATENT DOCUMENTS

| | | | | |
|---|---|---|---|---|
| 3,423,518 | A * | 1/1969 | Weagant .................... | 174/153 G |
| 4,306,698 | A * | 12/1981 | Gonia et al. ................ | 248/74.1 |
| 5,213,290 | A * | 5/1993 | Moretti .................... | 248/56 |
| 5,276,280 | A * | 1/1994 | Ball .......................... | 174/652 |
| 6,490,947 | B2 * | 12/2002 | Burger ...................... | 74/502.4 |
| 6,518,506 | B2 * | 2/2003 | Zink et al. ................. | 174/138 R |
| 8,288,667 | B2 * | 10/2012 | Chiou ....................... | 174/652 |

FOREIGN PATENT DOCUMENTS

| | | | |
|---|---|---|---|
| DE | 3029454 A | * | 3/1982 |
| DE | 4334529 | | 4/1994 |
| DE | 19825989 | | 11/1999 |

OTHER PUBLICATIONS

Corresponding Office Action issued by the GPTO on Nov. 10, 2014.

\* cited by examiner

*Primary Examiner* — Gwendolyn Baxter
(74) *Attorney, Agent, or Firm* — The Belles Group, P.C.

(57) ABSTRACT

A cable anchoring device which is coupled to a bracket may be provided that includes: a cap which includes an insertion portion including a thin portion and a thick portion which are integrally formed with each other; a groove socket which includes an insertion groove into which the insertion portion is inserted and a bracket anchoring part in which a bracket anchoring groove in which the bracket is anchored is formed; and a pressing member which presses such that the thick portion is located in the bracket anchoring groove.

9 Claims, 12 Drawing Sheets

CABLE ANCHORING DEVICE

CROSS REFERENCE TO RELATED APPLICATIONS

Priority is claimed under 35 U.S.C. §119 to Korean Patent Application Serial No. 10-2014-0012476, filed Feb. 4, 2014, the disclosure of which is incorporated herein by reference in its entirety.

FIELD OF THE INVENTION

The present invention relates to a cable anchoring device and more particularly to a cable anchoring device which is coupled to a bracket of a vehicle.

BACKGROUND OF THE INVENTION

A cable anchoring device is used for anchoring various control cables within a vehicle, etc.

Generally, a plurality of various kinds of cables are installed in machinery such as a vehicle, etc. Here, for the purpose of preventing the cable installed in the machinery such as a vehicle, etc., from being bent or being worn out due to friction, a cable anchoring device guiding the cable is employed. Here, by using the cable anchoring device, the cable is coupled to a bracket fixed to the body of the vehicle.

However, in the past, when the cable is coupled to the bracket, a member which is inserted into a bracket like a clip, and a separate member that is separated from the said member have been used in order to prevent the cable from being separated from the bracket. Due to the use of the separate member, the number of the parts of the cable anchoring device becomes larger, so that the manufacturing cost becomes higher and the separate member may be lost during the coupling/separating process.

Also, among conventional cable anchoring devices, there has been a cable anchoring device in which the member for preventing the cable from being separated from the bracket is not separated from the member which is inserted into the bracket. However, the member that prevents the separation of the cable from the bracket and the member that is inserted into the bracket when the cable is coupled to the bracket are separate components. Therefore, if the bracket, the member that is inserted into the bracket, and the member that prevents the cable from being separated from the bracket are not correctly aligned, the bracket and the cable may not be fastened to each other.

Accordingly, even when the bracket, the member that is inserted into the bracket, and the member that prevents the cable from being separated from the bracket are not correctly aligned, it became necessary to research the cable anchoring device capable of easily fastening the bracket to the cable without using the separate member.

SUMMARY OF THE INVENTION

One embodiment is a cable anchoring device which is coupled to a bracket may be provided that includes: a cap which includes an insertion portion including a thin portion and a thick portion which are integrally formed with each other; a groove socket which includes an insertion groove into which the insertion portion is inserted and a bracket anchoring part in which a bracket anchoring groove in which the bracket is anchored is formed; and a pressing member which presses such that the thick portion is located in the bracket anchoring groove.

The cable anchoring device may further include a protective member into which an end of the groove socket is inserted.

A first inclined surface may be formed in the thick portion.

A second inclined surface may be formed in the thick portion.

An outer diameter ØB' of the thick portion may be larger than a width "A" of an entrance of the bracket.

An outer diameter ØA' of the thin portion may be less than a width "A" of an entrance of the bracket.

The groove socket may include a movement preventing part, and the cap may include an elastic leg corresponding to the movement preventing part.

The pressing member may be a spring.

The pressing member may be disposed between the anchoring part and the cap.

DETAILED DESCRIPTION OF THE INVENTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Hereafter, a cable anchoring device 10 and a bracket 600 according to an embodiment will be described with reference to FIGS. 1 to 12.

Figure 1:
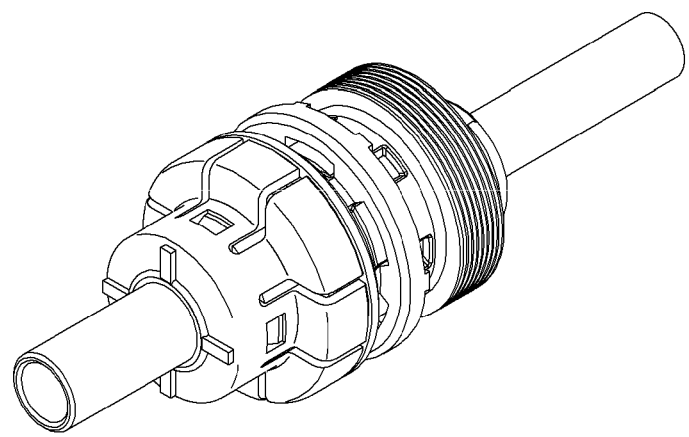
FIG. 1 is a perspective view of a cable anchoring device according to an embodiment.
Figure 2:
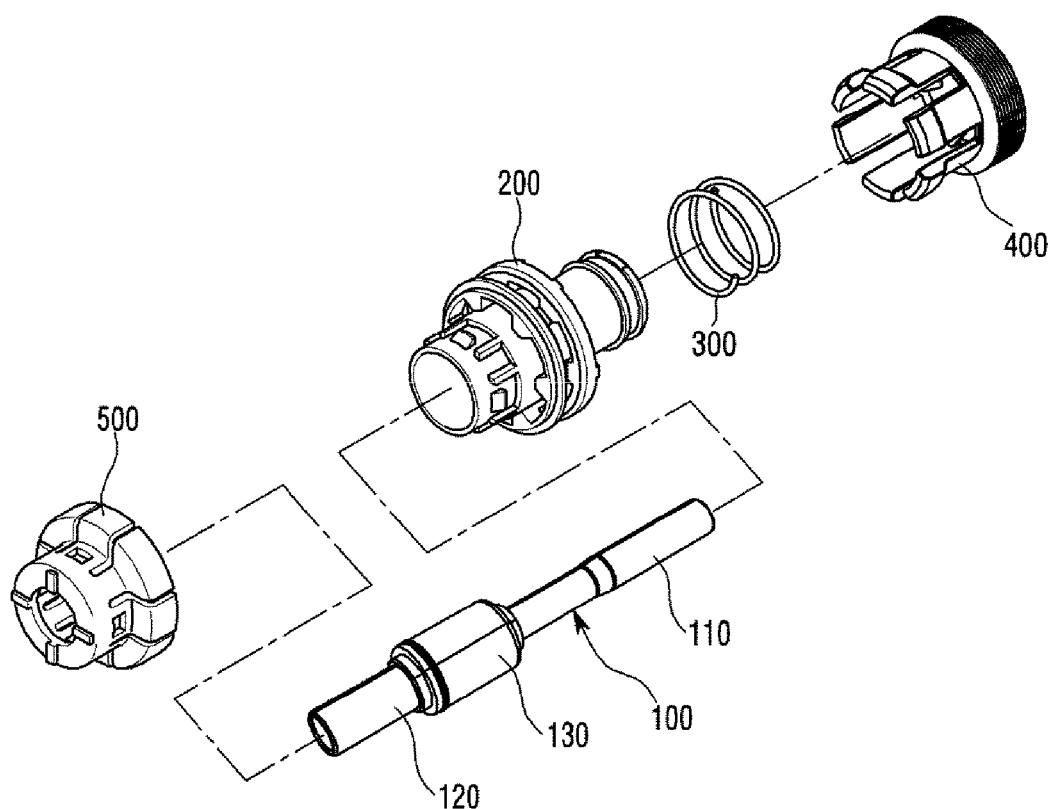
FIG. 2 is an exploded perspective view of the cable anchoring device according to the embodiment.

FIG. 1 is a perspective view of a cable anchoring device according to an embodiment. FIG. 2 is an exploded perspective view of the cable anchoring device according to the embodiment.

Referring to FIGS. 1 and 2, the cable anchoring device 10 according to the embodiment includes a groove socket 200, a pressing member 300 and a cap 400. Also, the cable anchoring device 10 may further include a cable socket 100 and a protective member 500.

Figure 3:
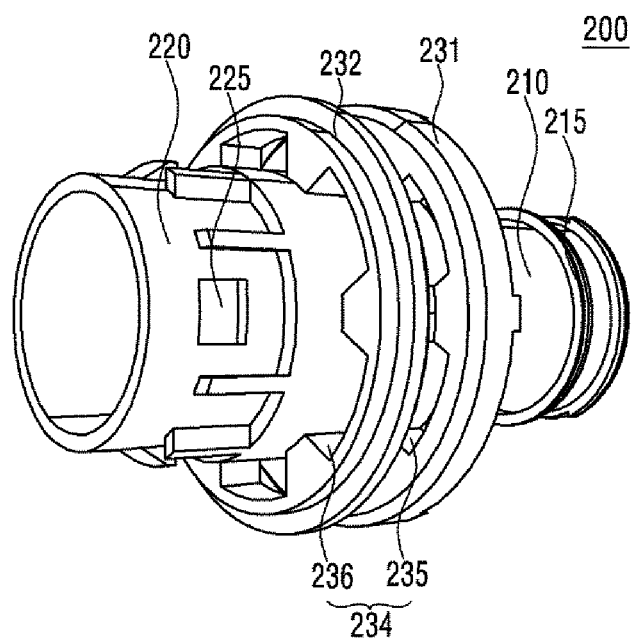
FIGS. 3 to 5 are views showing a groove socket shown in FIG. 5.
Figure 4:
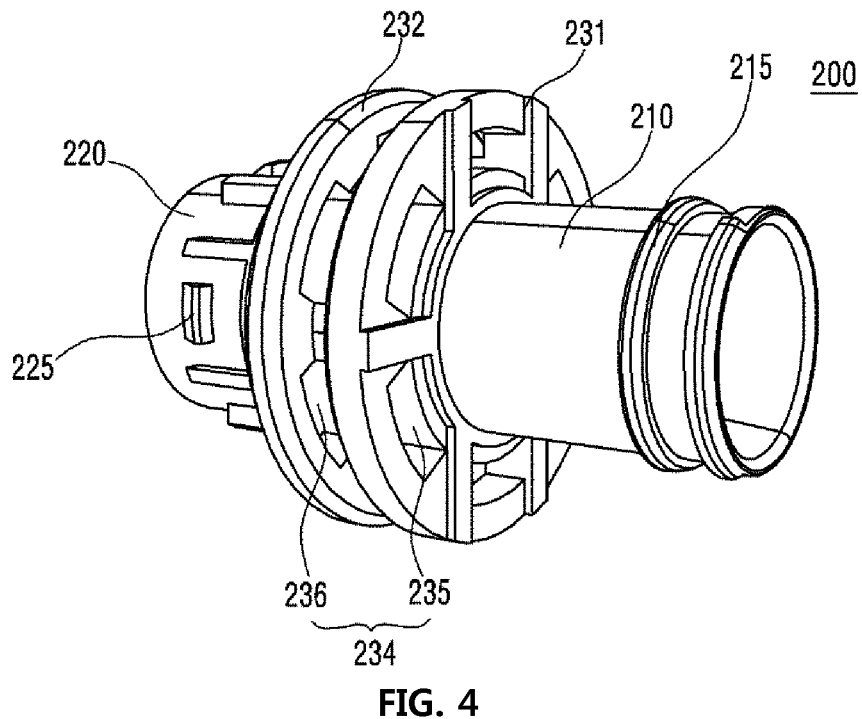
Figure 5:
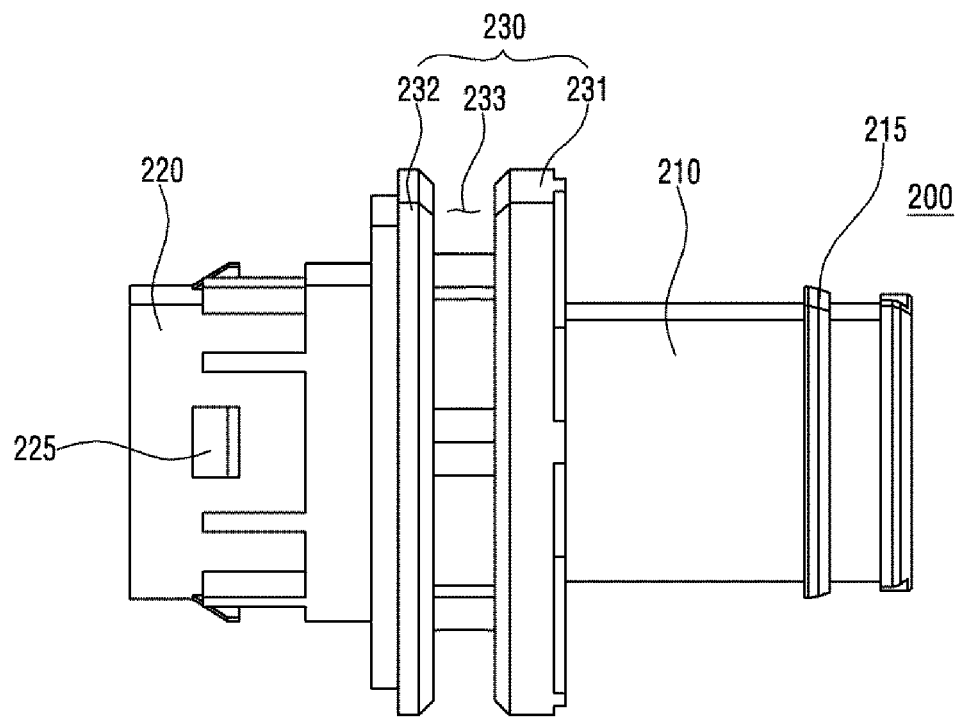

FIGS. 3 to 5 are views showing a groove socket shown in FIG. 5. Specifically, FIG. 3 is a view of the groove socket when viewed from one side. FIG. 4 is a view of the groove socket when viewed from the other side. FIG. 5 is a side view of the groove socket.

Referring to FIGS. 3 to 5, the groove socket 200 is formed to have a cylindrical tubular shape. The cable socket 100 to be described below is inserted and pushed into the groove socket 200.

The groove socket 200 includes a first body 210, a second body 220 and an anchoring pan 230.

The first body 210 includes a movement preventing part 215. The movement preventing part 215 is formed to protrude from the first body 210 or is formed concave such that when the below-described cap 400 is coupled to the first body 210, the coupled cap 400 is not easily separated from the groove socket 200.

The second body 220 includes a protrusion 225. The protrusion 225 is formed on the second body 220. At least one protrusion 225 may be provided. When the protrusion 225 is coupled to the protective member 500 to be described below, the coupled protective member 500 is not easily separated from the groove socket 200.

The anchoring part 230 is formed between the first body 210 and the second body 220. The anchoring part 230 includes a bracket anchoring groove 233 which has a size sufficient to allow the below-described bracket 600 to be fitted and fixed thereto. The anchoring part 230 includes an insertion groove 234. An insertion portion 420 to be described below is inserted into the insertion groove 234. Also, the anchoring part 230 includes a first anchoring part 231 and a second anchoring part 232 which are divided by the bracket anchoring groove 233. The insertion groove 234 includes a first insertion groove 235 formed in the first anchoring part 231, and a second insertion groove 236 formed in the second anchoring part 232.

Here, the first insertion groove 235 and the second insertion groove 236 may have the same shape or may have mutually different shapes. The number of the first insertion grooves 235 may or may not be equal to the number of the second insertion grooves 236. The numbers of the first and second insertion grooves 235 and 236 may be equal to or greater than the number of the below-described insertion portions 420 of the cap 400.

The pressing member 300 may be a spring formed by winding in the form of a coil a string material having a circular or polygonal cross section. Here, the pressing member 300 is not limited to the spring and includes any member capable of pressing in such a manner as to cause a thick portion 422 to be described below to be placed in the bracket anchoring groove 233. It the pressing member 300 is a spring, the pressing member 300 may be disposed on the outer circumferential surface of the first body 210 of the groove socket 200.

Figure 6:
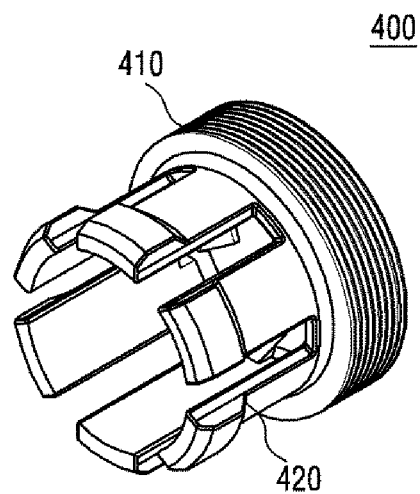
FIGS. 6 to 10 are views showing a cap shown in FIG. 2.
Figure 7:
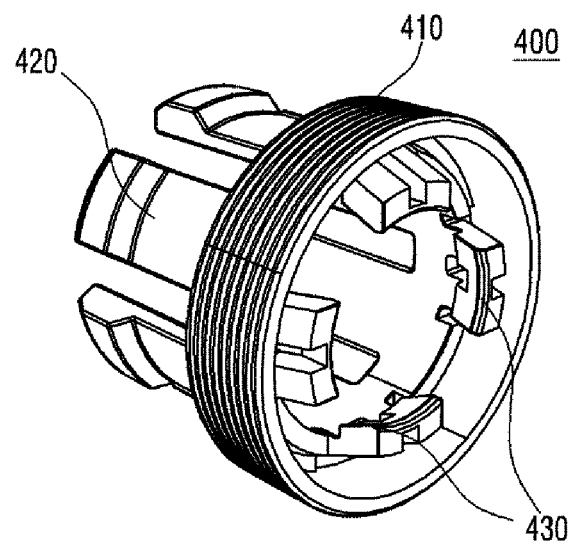
Figure 8:
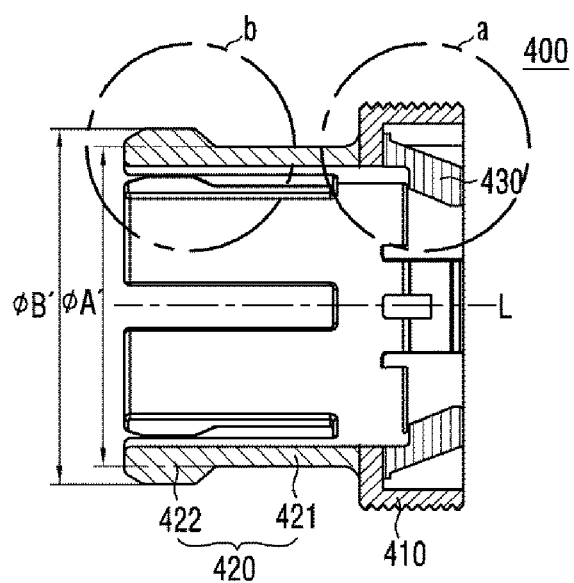
Figure 9:
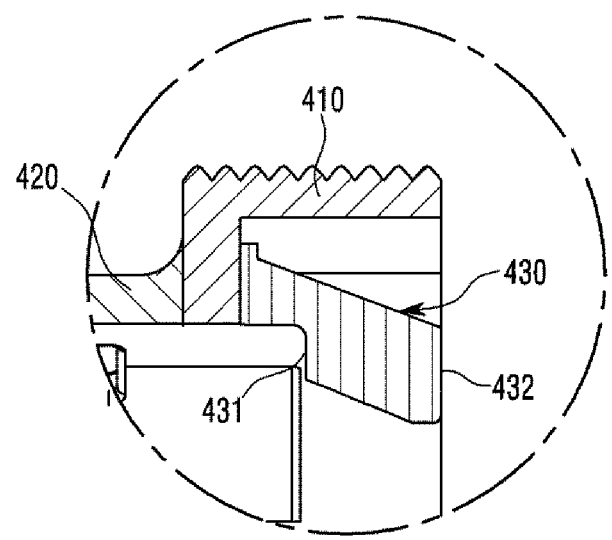
Figure 10:
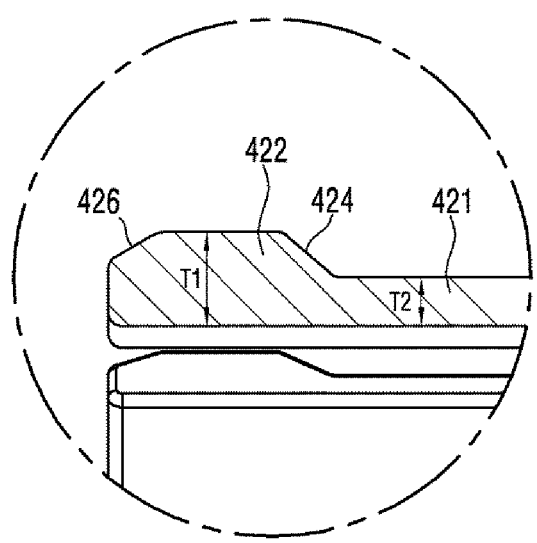

FIGS. 6 to 10 are views showing the cap shown in FIG. 2. Specifically, FIG. 6 is a view of the cap when viewed from one side. FIG. 7 is a view of the cap when viewed from the other side. FIG. 8 is a cross sectional view of the cap. FIG. 9 shows an enlarged part denoted by 'a' shown in FIG. 8. FIG. 10 shows an enlarged part denoted by 'b' shown in FIG. 8.

Referring to FIGS. 6 to 10, the cap 400 is formed to have an annular donut shape. As shown in FIG. 2, one end of the groove socket 200 is inserted into the cap 400. Here, the pressing member 300 may be disposed between the cap 400 and the groove socket 200.

Specifically, the cap 400 includes a body 410, the insertion portion 420, and an elastic leg 430.

Grooves or protrusions may be formed on the outer circumferential surface of the body 410 at a regular interval. Since the grooves or protrusions are formed on the outer circumferential surface of the body 410, a friction force may be increased. The shape of the outer circumferential surface of the body 410 according to the embodiment may include any shape capable of increasing the friction force.

The insertion portion 420 is inserted into the first insertion groove 235 of the first anchoring part 231 and into the second insertion groove 236 of the second anchoring part 232. Therefore, the insertion portion 420 may be formed to have a length enough to be inserted from the first anchoring part 231 to the second anchoring part 232.

Specifically, the insertion portion 420 includes a thin portion 421 and the thick portion 422. The thin portion 421 is formed extending from the body 410. The thick portion 422 is formed integrally with the end of the thin portion 421.

The thickness T1 of the thick portion 422 may be larger than the thickness T2 of the thin portion 421. Therefore, the insertion portion 420 may have a two-step shape in which the outer diameter ØA' of the thin portion 421 is different from the outer diameter ØB' of the thick portion 422. Specifically, the outer diameter ØA' of the thin portion 421 is less than the outer diameter ØB' of the thick portion 422.

Further, the thick portion 422 may have at least one inclined surface. Specifically, a first inclined surface 424 is formed in one end of both ends of the thick portion 422, which is closer to the body 410, and a second inclined surface 426 is formed in the other end.

Also, the thick portion 422 of the insertion portion 420 may have a shape corresponding to those of the first insertion groove 235 and the second insertion groove 236.

The elastic leg 430 may be formed on the inner circumferential surface of the body 410 in the opposite direction to the direction in which the insertion portion 420 has been formed, the end of the elastic leg 430 may be formed inclined toward the central axis L of the cap 400. Specifically, the elastic leg 430 includes a first locking surface 431 formed in a direction in which the insertion portion 420 has been formed and a second locking surface 432 formed in the opposite direction to the direction in which the insertion portion 420 has been formed.

Here, if the pressing member 300 is the spring, the pressing member 300 is supported by the groove socket 200 and the cap 400. Specifically, one end of the pressing member 300 is supported by the first anchoring part 231 of the groove socket 200, and the other end of the pressing member 300 is supported by the first locking surface 431 of the elastic leg 430. The first locking surface 431 prevents the pressing member 300 from being separated.

When the first body 210 of the groove socket 200 is inserted into the cap 400, the elastic leg 430 is transformed in a farther direction from the central axis L of the cap 400 by the movement preventing part 215 of the first body 210. When the first body 210 of the groove socket 200 is completely inserted into the cap 400, the transformed elastic leg 430 restores to the original state.

Therefore, the second locking surface 432 of the elastic leg 430 keeps the cap 400 from being separated from the groove socket 200. Specifically, when the cap 400 is about to be separated from the groove socket 200, the second locking surface 432 is locked by the movement preventing part 215, and thus, the cap 400 is prevented from being separated from the groove socket 200.

Figure 11:
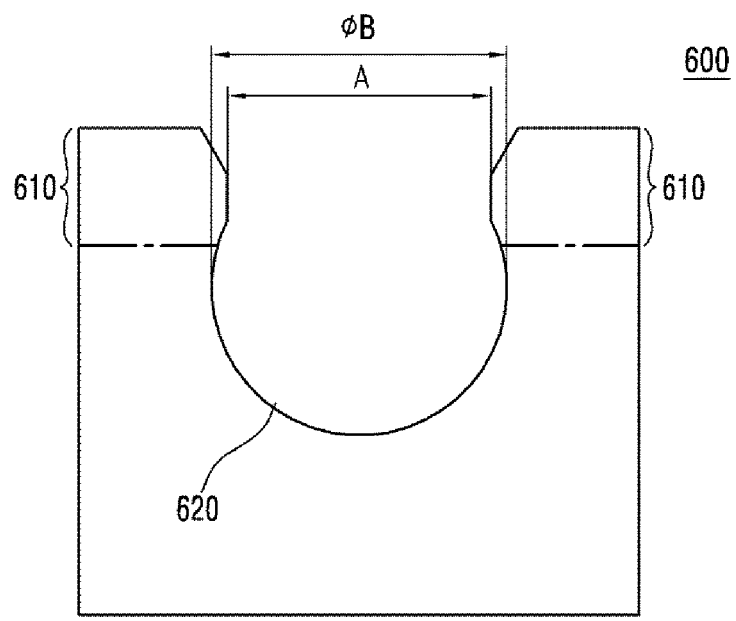
FIG. 11 is a cross sectional view of a bracket.

FIG. 11 is a cross sectional view of the bracket.

Referring to FIGS. 8 and 11, the bracket 600 includes a locking part 610. A mounting recess 620 is formed in the bracket 600.

The locking part 610 may be formed on both sides of the bracket 600. The shortest distance between the locking parts 610 formed on both sides of the bracket 600, that is, the width "A" of the entrance of the bracket is less than the inner diameter ØB of the mounting recess 620.

Figure 20:
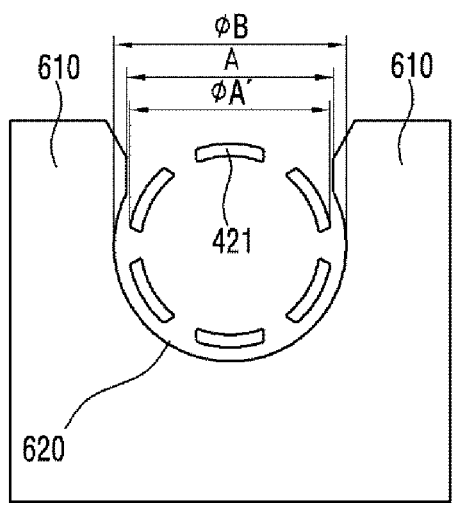
FIG. 20 is a cross sectional view taken along c-c' shown in FIG. 19.

Further, as shown in FIG. 20, the outer diameter of the thin portion 421 is less than both the width "A" of the entrance of the bracket 600 and the inner diameter ØB of the mounting recess 620.

Figure 22:
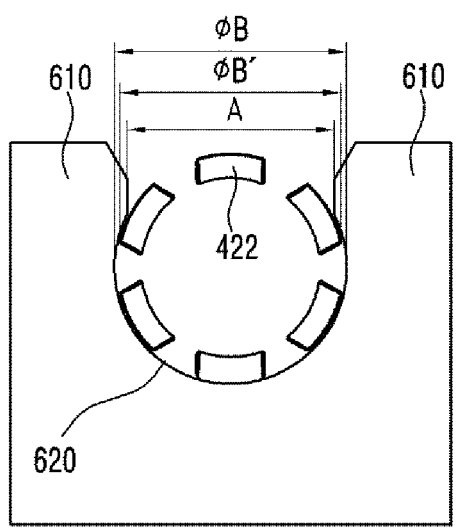
FIG. 22 is a cross sectional view taken along d-d' shown in FIG. 21.

Further, as shown in FIG. 22, the outer diameter ØB' of the thick portion 422 is larger than the width "A" of the entrance of the bracket 600 and is less than the inner diameter ØB of the mounting recess 620.

As a result, while it is possible for the thin portion 421 of the cap 400 to pass perpendicularly through between the locking parts 610 formed on both sides of the bracket 600, the thick portion 422 is not able to pass perpendicularly through.

A more detailed description thereof will be provided by taking an example. The width "A" of the entrance of the bracket may be 28.2 mm, and the inner diameter ØB of the mounting recess 620 may be 31.85 mm. Here, the outer diameter ØA' of the thin portion 421 may be 27.8 mm less than the width "A" of the entrance of the bracket. Also, the outer diameter ØB' of the thick portion 422 may be 31.65 mm larger than the width "A" of the entrance of the bracket and less than the inner diameter ØB of the mounting recess 620.

Accordingly, the outer diameter ØA' of the thin portion 421, the width "A" of the entrance of the bracket, the outer diameter ØB' of the thick portion 422, and the inner diameter ØB of the mounting recess 620 may have a relation of ØA'<A<ØB'<ØB.

The cable socket 100 may include a guide pipe 110, an anchoring pipe 120, and a housing 130.

The guide pipe 110 has a cylindrical tubular shape. A core (not shown) of a control cable (not shown) is inserted and pushed into the guide pipe 110. The diameter of the guide pipe 110 is less than the inner diameter of the groove socket 200. Therefore, the guide pipe 110 is inserted into the groove socket 200. Here, the inserted core of the control cable may slide within the guide pipe 110 in a longitudinal direction of the guide pipe 110.

The anchoring pipe 120 has a cylindrical tubular shape. An outer of the control cable is inserted and pushed into the anchoring pipe 120. The diameter of the anchoring pipe 120 is less than the inner diameter of the groove socket 200. Therefore, the anchoring pipe 120 is inserted into the groove socket 200.

The housing 130 has a receiving space formed therein. One end of the guide pipe 110 and an end of the anchoring pipe 120 are disposed in the receiving space.

Here, though not shown in the drawings, the end of the guide pipe 110 and the end of the anchoring pipe 120 are disposed separately from each other in the receiving space of the housing 130.

Figure 12:
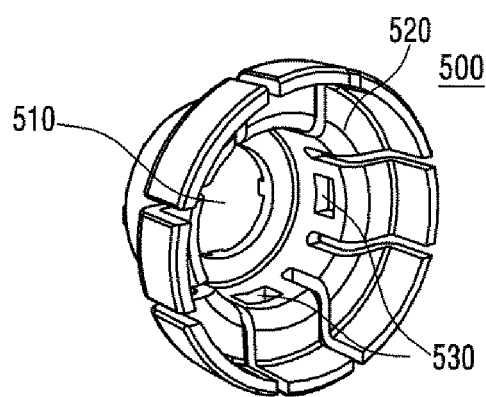
FIG. 12 is a perspective view of a protective member shown in FIG. 2.

FIG. 12 is a perspective view of a protective member shown in FIG. 2.

Referring to FIG. 12, the protective member 500 includes a restrictor 520 and a fastening hole 530. The protective member 500 has an opening recess 510, so that the other end of the groove socket 200 may be inserted into the opening recess 510. Specifically, the protective member 500 may be disposed in such a manner as to enclose the second body 220 of the groove socket 200.

When the insertion portion 420 of the cap 400 is inserted into the second insertion groove 236 of the groove socket 200, the restrictor 520 may stop the insertion portion 420 such that the insertion portion 420 is not inserted more than a predetermined length.

One or more fastening holes 530 may be provided. The fastening hole 530 is formed to have a shape corresponding to that of the protrusion 225 of the groove socket 200 and is formed at a position corresponding to the protrusion 225.

The fastening hole 530 prevents the protective member 500 from being separated from the groove socket 200. Specifically, the protrusion 225 of the groove socket 200 is fastened to the fastening hole 530, thereby restricting the movement of the protective member 500. As a result, it is possible to prevent the protective member 500 from being separated from the groove socket 200.

Also, the protective member 500 is able to prevent the insertion portion 420 from being contaminated by dust and contaminants.

Hereafter, a coupling process of the cable anchoring device 10 and the bracket 600 will be described with reference to FIGS. 1 to 22 in accordance with the embodiment.

Figure 13:
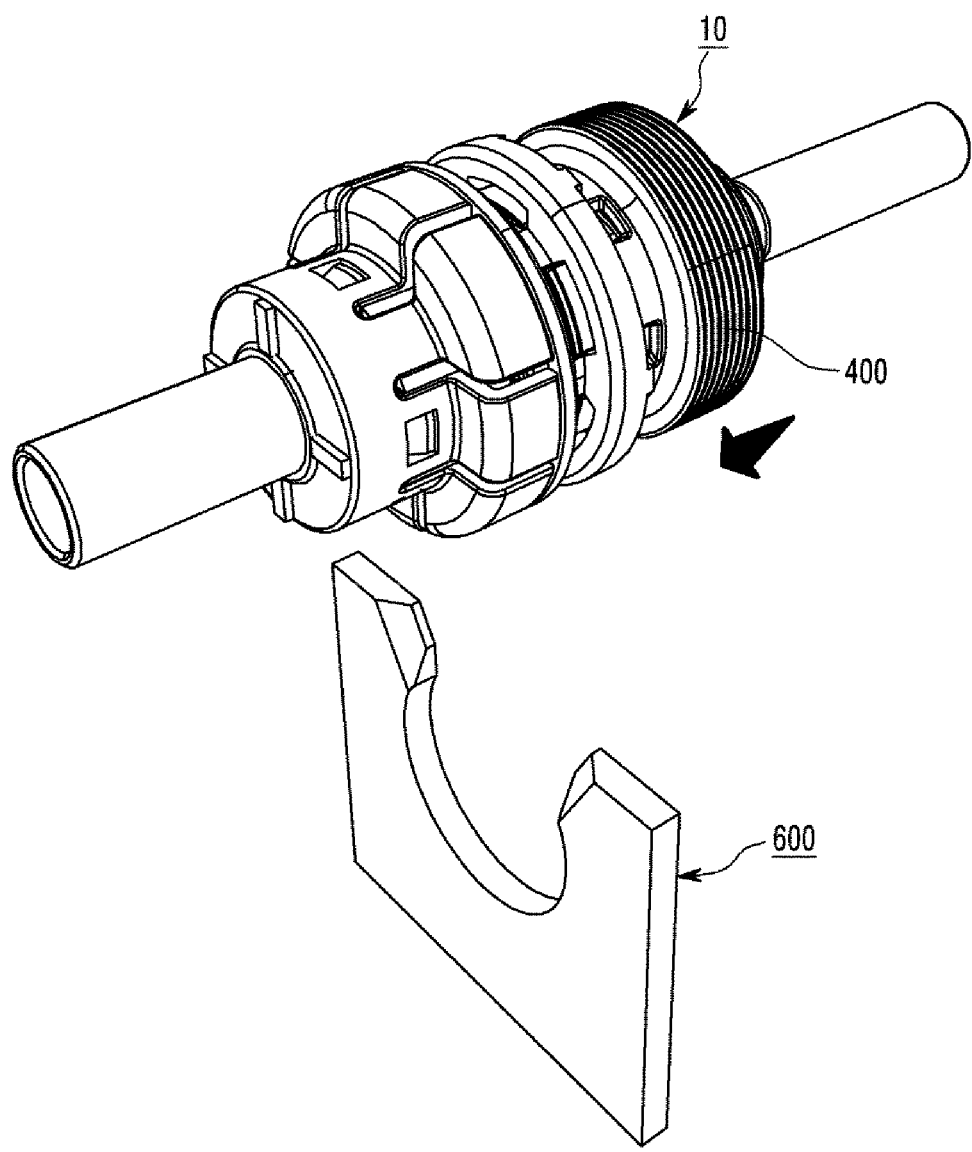
FIGS. 13 to 16 are views for describing a coupling process of the cable anchoring device and the bracket.
Figure 14:
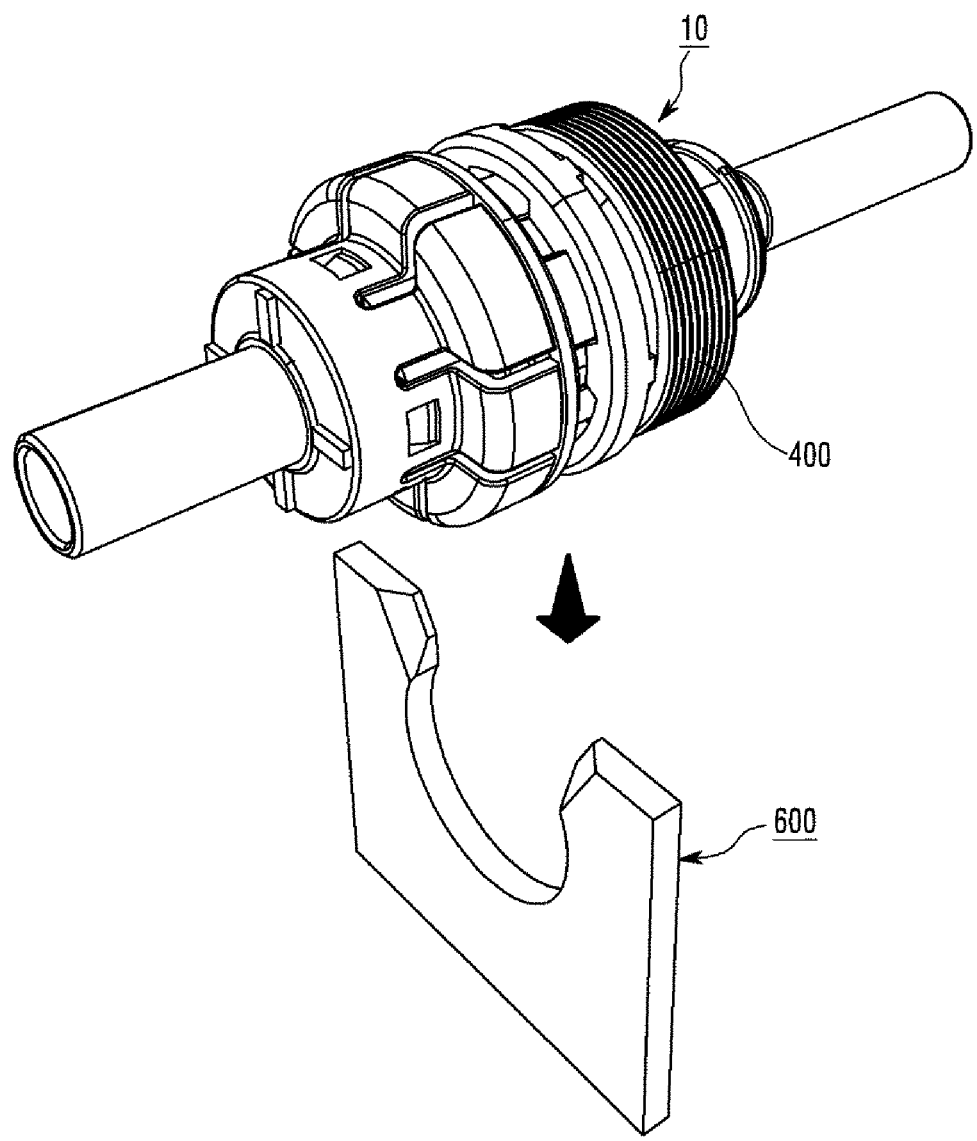
Figure 15:
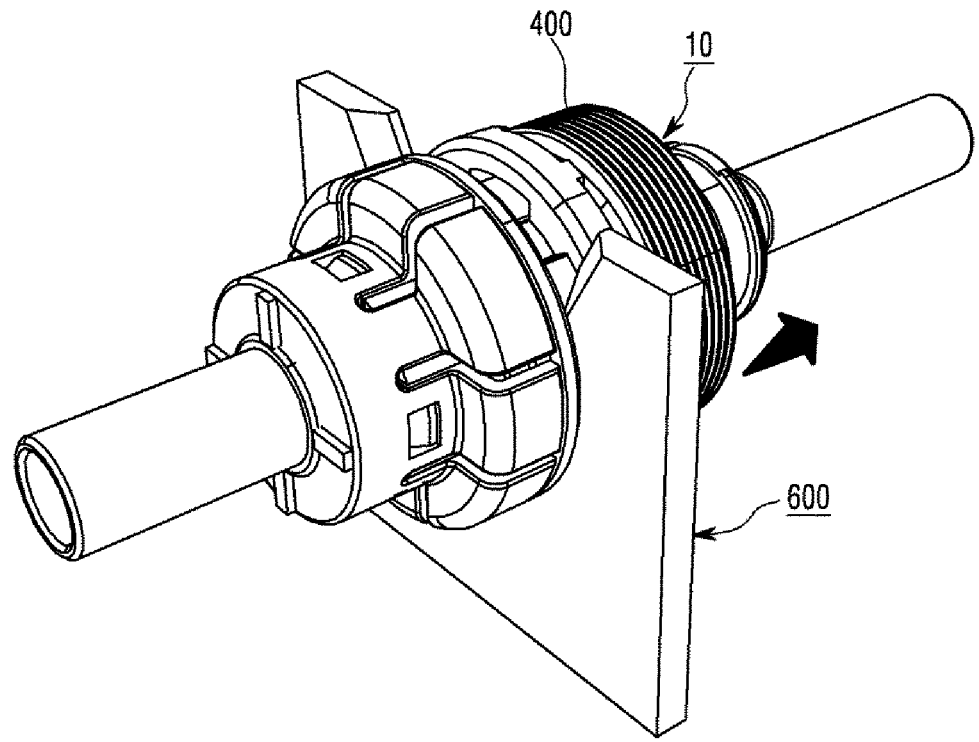
Figure 16:
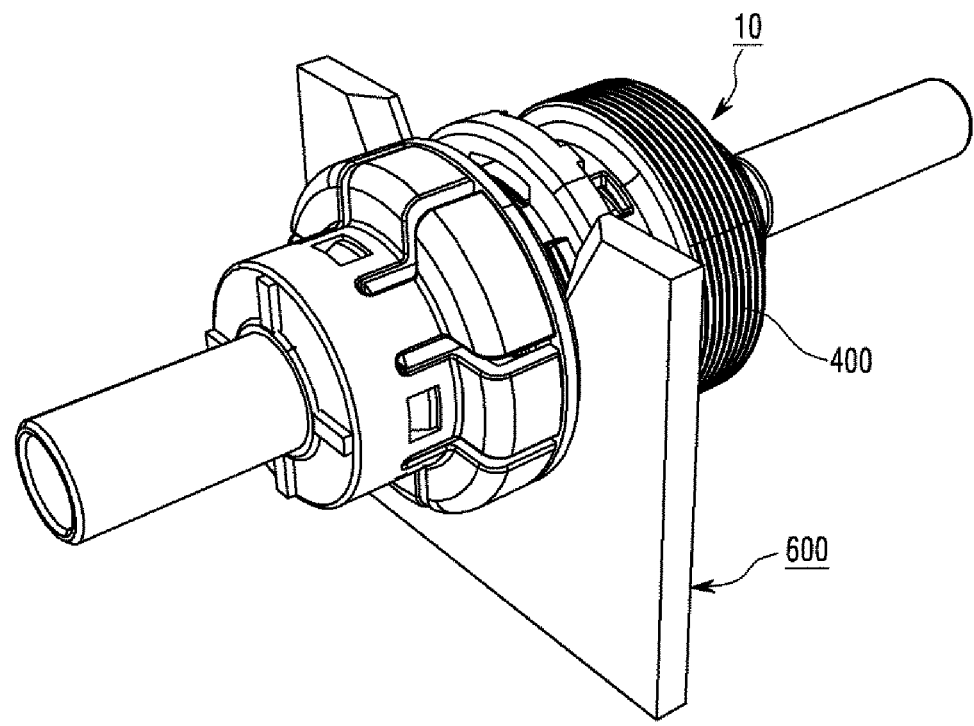

FIGS. 13 to 16 are views for describing the coupling process of the cable anchoring device and the bracket. Specifically, FIG. 13 shows that the cable anchoring device has been separated from the bracket. FIG. 14 shows that the cable anchoring device can be inserted into the bracket by applying an external force to the cap of the cable anchoring device. FIG. 15 shows that the cable anchoring device has been inserted into the bracket under the state where the external force has been applied to the cap of the cable anchoring device. FIG. 16 shows that the cable anchoring device has been coupled to the bracket.

Figure 17:
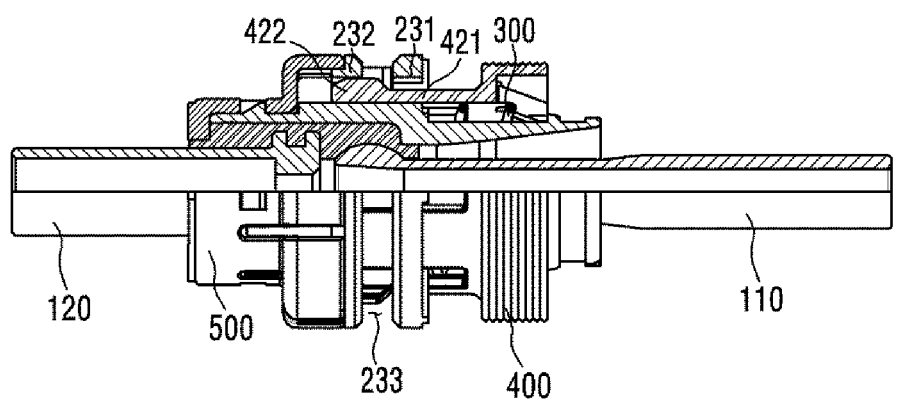
FIG. 17 is a partial cross sectional side view of the cable anchoring device shown in FIG. 13.
Figure 18:
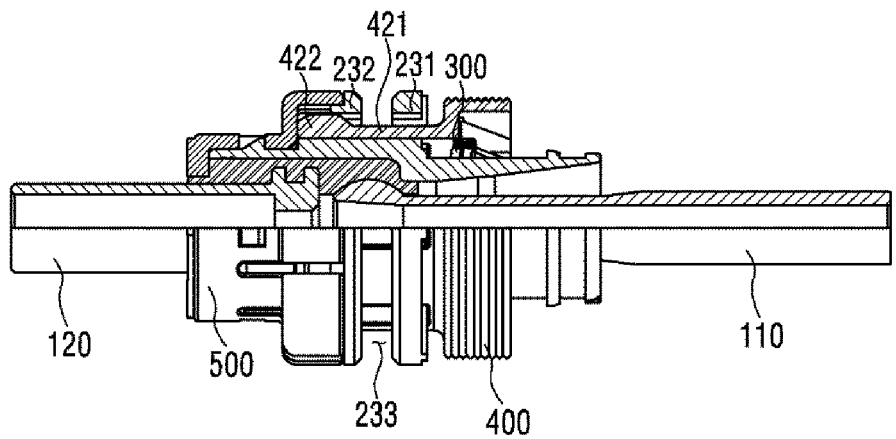
FIG. 18 is a partial cross sectional side view of the cable anchoring device shown in FIG. 14.
Figure 19:
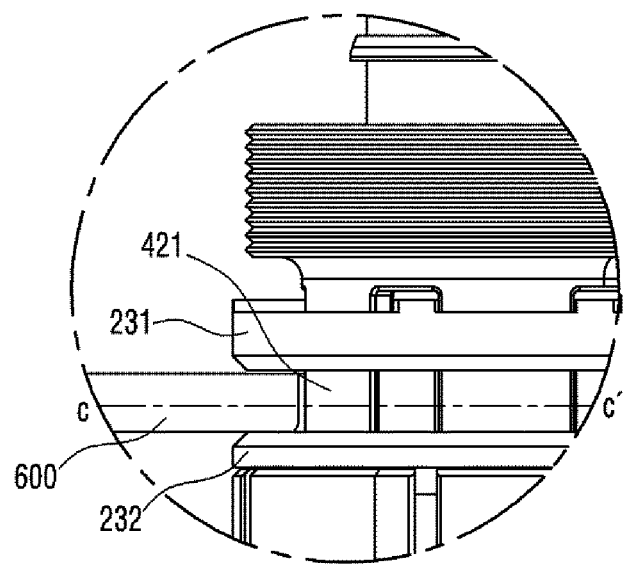
FIG. 19 is a top partial enlarged view of FIG. 15.
Figure 21:
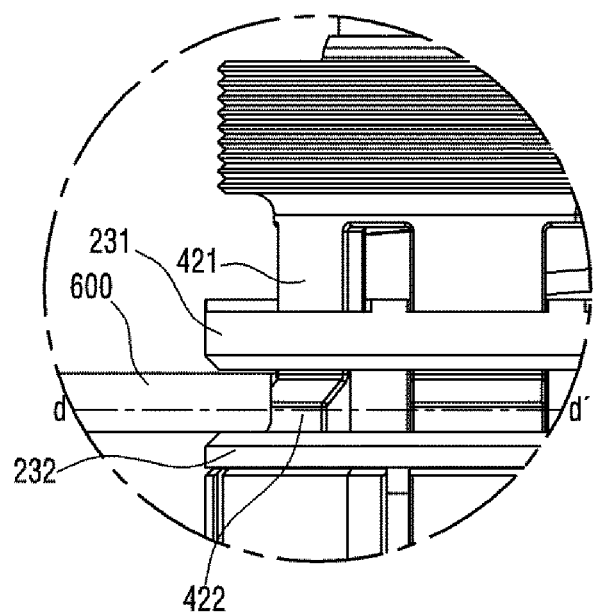
FIG. 21 is a top partial enlarged view of FIG. 16.

Also, FIG. 17 is a partial cross sectional side view of the cable anchoring device shown in FIG. 13. FIG. 18 is a partial cross sectional side view of the cable anchoring device shown in FIG. 14. FIG. 19 is a top partial enlarged view of FIG. 15. FIG. 20 is a cross sectional view taken along c-c' shown in FIG. 19. FIG. 21 is a top partial enlarged view of FIG. 16. FIG. 22 is a cross sectional view taken along d-d' shown in FIG. 21.

As shown in FIGS. 13 and 17, no external force is applied to the cap 400 of the cable anchoring device 10. The thick portion 422 of the cap 400 is located in the bracket anchoring groove 233 of the groove socket 200.

As shown in FIGS. 14 and 18, when the external force is applied to the cap 400 of the cable anchoring device 10 in a direction of the anchoring part 230 of the groove socket 200, the body 410 of the cap 400 moves toward the first anchoring part 231 of the groove socket 200, and the thick portion 422 of the cap 400 is fully inserted into the second insertion groove 236. As a result, the thin portion 421 of the cap 400 is located in the bracket anchoring groove 233 of the groove socket 200.

Also, even when the thick portion 422 of the cap 400 is correctly aligned with the insertion groove 234 of the groove socket 200, the second inclined surface 426 formed in the thick portion 422 slides with a contact with the anchoring part 230 of the groove socket 200, so that the thick portion 422 of the cap 400 is inserted into the insertion groove 234 of the groove socket 200.

Here, in a case where the pressing member 300 is a spring, when the body 410 of the cap 400 becomes closer to the first anchoring part 231 of the groove socket 200, the pressing member 300 generates an elastic force causing the first anchoring part 231 to become farther from the first locking surface 431 because the pressing member 300 has been pressed between the first anchoring part 231 of the groove socket 200 and the first locking surface 431 of the cap 400.

As shown in FIGS. 15, 19 and 20, under the state where the thin portion 421 of the cap 400 is located in the bracket anchoring groove 233 of the groove socket 200, the cable anchoring device 10 is inserted into the mounting recess 620 of the bracket 600. Specifically, since the outer diameter ØA' of the thin portion 421 is less than the width "A" of the entrance of the bracket, the cable anchoring device 10 is easily inserted into the mounting recess 620 of the bracket 600.

As shown in FIGS. 16, 21 and 22, the cable anchoring device 10 is coupled to the bracket 600. Specifically, in the case where the pressing member 300 is a spring, when the cable anchoring device 10 is inserted into the mounting recess 620 of the bracket 600, the external force applied to the cap 400 is removed. In this case, due to the elastic force of the pressing member 300, the body 410 of the cap 400 becomes farther from the first anchoring part 231 of the groove socket 200.

Contrarily, in a case where the pressing member 300 is not a spring, the body 410 of the cap 400 becomes farther from the first anchoring part 231 of the groove socket 200 by applying another external force.

As a result, the thick portion 422 of the cap 400 is located in the bracket anchoring groove 233 of the groove socket 200.

Accordingly, since the outer diameter ØB' of the thick portion 422 is larger than the width "A" of the entrance of the bracket, the upward movement of the cable anchoring device 10 is restricted. Also, the forward and backward movements of the cable anchoring device 10 are restricted by the first anchoring part 231 and the second anchoring part 232 of the groove socket 200.

As such, all of the upward, forward and backward movements of the cable anchoring device 10 are restricted. As a result, the cable anchoring device 10 is completely coupled to the bracket 600.

Further, even when the central axis of the cap 400 is not aligned with the central axis of the mounting recess 620 of the bracket 600 under the state where the thin portion 421 of the cap 400 is located in the bracket anchoring groove 233 of the groove socket 200, the body 410 of the cap 400 becomes farther from the first anchoring part 231 of the groove socket 200, and then the first inclined surface 424 formed in the second locking surface 432 of the cap 400 slides with a contact with the bracket 600. Accordingly, the position of the cable anchoring device 10 is adjusted within the mounting recess 620 such that the central axis of the cap 400 is aligned with the central axis of the mounting recess 620 of the bracket 600.

Here, the second locking surface 432 of the cap 400 is caught by the movement preventing part 215 of the groove socket 200, so that the cap 400 is prevented from being separated from the first body 210 of the groove socket 200.

Describing a process of separating the cable anchoring device 10 from the bracket 600, first, an external force is applied to the cap 400 of the cable anchoring device 10 in the direction of the anchoring part 230 of the groove socket 200, so that the thin portion 421 of the cap 400 is located in the bracket anchoring groove 233 of the groove socket 200. Then, the cable anchoring device 10 is separated upward from the mounting recess 620 of the bracket 600.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A cable anchoring device which is coupled to a bracket, the cable anchoring device comprising:
   a cap which includes an insertion portion including a thin portion and a thick portion which are integrally formed with each other;
   a groove socket which includes a bracket anchoring part including an insertion groove into which the insertion portion is inserted and including a bracket anchoring groove in which the bracket is anchored; and
   a pressing member which presses such that the thick portion is located in the bracket anchoring groove.

2. The cable anchoring device of claim 1, further comprising a protective member into which an end of the groove socket is inserted.

3. The cable anchoring device of claim 1, wherein a first inclined surface is formed in the thick portion.

4. The cable anchoring device of claim 1, wherein a second inclined surface is formed in the thick portion.

5. The cable anchoring device of claim 1, wherein an outer diameter ØB' of the thick portion is larger than a width "A" of an entrance of the bracket.

6. The cable anchoring device of claim 1, wherein an outer diameter ØA' of the thin portion is less than a width "A" of an entrance of the bracket.

7. The cable anchoring device of claim 1, wherein the groove socket comprises a movement preventing part, and wherein the cap comprises an elastic leg corresponding to the movement preventing part.

8. The cable anchoring device of claim 1, wherein the pressing member is a spring.

9. The cable anchoring device of claim 8, wherein the pressing member is disposed between the anchoring part and the cap.

* * * * *